(12) United States Patent
Lee

(10) Patent No.: US 8,282,789 B2
(45) Date of Patent: *Oct. 9, 2012

(54) MICROWAVE APPARATUS AND METHOD OF EXTRACTING ESSENTIAL OILS, ESSENCE, AND PIGMENTS WITH GAS FLOW

(76) Inventor: Bing-Nan Lee, Pingtung (TW)

(*) Notice: Subject to any disclaimer, the term of this patent is extended or adjusted under 35 U.S.C. 154(b) by 503 days.

This patent is subject to a terminal disclaimer.

(21) Appl. No.: 12/467,319

(22) Filed: May 18, 2009

(65) Prior Publication Data

US 2010/0288621 A1 Nov. 18, 2010

(51) Int. Cl.
*B01D 3/34* (2006.01)
*B01D 5/00* (2006.01)
*B01D 11/00* (2006.01)
*H05B 6/64* (2006.01)

(52) U.S. Cl. .......... 202/170; 99/451; 99/DIG. 14; 137/511; 137/904; 159/16.1; 159/DIG. 26; 202/160; 202/202; 210/117; 210/150; 210/200; 219/679; 219/686; 422/255; 422/288; 422/291

(58) Field of Classification Search .......... 34/259; 47/10; 99/451, DIG. 14; 137/511, 904; 159/16.1, 159/DIG. 26, DIG. 42; 202/160, 170, 202, 202/269; 210/117, 150, 200; 219/679, 686; 422/255, 288, 291

See application file for complete search history.

(56) References Cited

U.S. PATENT DOCUMENTS

| 3,192,687 | A | * | 7/1965 | Silva et al. | 95/26 |
| 4,317,721 | A | * | 3/1982 | Pynnonen | 210/120 |
| 5,002,784 | A | * | 3/1991 | Pare et al. | 426/241 |
| 5,427,741 | A | * | 6/1995 | Bennett | 422/547 |
| 5,458,178 | A | * | 10/1995 | Nakamura | 160/172 R |
| 5,458,897 | A | * | 10/1995 | Pare | 426/241 |
| 5,711,857 | A | * | 1/1998 | Armstrong | 202/235 |
| 5,884,417 | A | * | 3/1999 | Pare | 34/263 |
| 6,783,736 | B1 | * | 8/2004 | Taylor et al. | 422/554 |
| 2004/0129389 | A1 | * | 7/2004 | Lecoffre | 159/16.1 |

* cited by examiner

*Primary Examiner* — Virginia Manoharan

(57) ABSTRACT

Extraction apparatus and method for obtaining essential oils, essence, and pigments from odorous raw materials (e.g., plant materials and Chinese medicinal herbs) by microwave radiation heating have advantages of easy operation, higher extracting temperature and efficiency. The microwave chamber has a power level of 100 W to 1,500 W and its microwave radiation has a frequency at 915 MHz or 2,450 MHz. The extraction process can be performed without any preheating necessary. A condenser is operated at temperatures between −20° C. and 15° C. for cooling the gas flowing out of the extraction cartridges. Because both volatile fragrant compounds and pigments of the odorous raw materials can be extracted successfully by the top-down extraction fashion, the extracted essence is colorful. Since the extraction process by microwave heating is free from adding any organic solvent and/or any artificial chemical compound, the extraction apparatus and method are environmentally friendly.

1 Claim, 3 Drawing Sheets

MICROWAVE APPARATUS AND METHOD OF EXTRACTING ESSENTIAL OILS, ESSENCE, AND PIGMENTS WITH GAS FLOW

BACKGROUND OF THE INVENTION

1. Field of Invention

The invention relates to extraction apparatus and method thereof and more particularly to an apparatus of obtaining essential oils, essence, and pigments from odorous raw materials (e.g., plant materials and Chinese medicinal herbs) by microwave heating and method thereof.

2. Description of Related Art

Distillation methods are well known in the art. A type of simple distillation method is batch distillation. Drawbacks of a batch distillation are detailed below. Vapor with volatile substances may be condensed prior to leaving the extraction cartridge due to heat loss results an obvious temperature decrease and a lower efficiency of extraction. Further, concentration of the volatile substances in the distillate (i.e., essence) is low since it is diluted with a large volume of water.

Other extraction methods are also well known in the art. One typical extraction apparatus is Soxhlet extractor. Drawbacks of the Soxhlet extractor include time consuming, a low reproducibility, and application of organic solvents during the extracting process.

Nowadays extraction methods including ultrasonic extraction and ultra critical extraction with carbon dioxide ($CO_2$) have been developed. Drawbacks of the ultrasonic extraction are adding of a large amount of organic solvent and time consuming during the extracting process. On the other hand, the ultra critical extraction with $CO_2$ has defects of low energy efficiency as well as its apparatus is costly.

The latest extraction method is microwave extraction by being heated with a microwave oven due to microwave heating revealing less thermal resistance effect than an electrical oven doing. Though the efficiency of microwave extraction is found higher than a batch distillation, it has been focused on heating water or organic solvents at bottom layer of microwave device to generate vapor for extraction of volatile compounds. The advantages and benefits of microwave extraction have not been fully utilized as viewed by the present inventor. Thus, the need for improvement still exists.

SUMMARY OF THE INVENTION

It is therefore one object of the invention to provide an apparatus of obtaining essential oils, essence, and pigments from odorous raw materials (e.g., plant materials and Chinese medicinal herbs) by microwave heating.

It is another object of the invention to provide a method of obtaining essential oils, essence, and pigments from odorous raw materials by microwave heating, which has advantages of easy operation, higher extracting temperature and efficiency, and less hot spots on the being heated material and prevents it from being burned or toasted.

The above and other objects, features and advantages of the invention will become apparent from the following detailed description taken with the accompanying drawings.

DETAILED DESCRIPTION OF THE INVENTION

Figure 1:
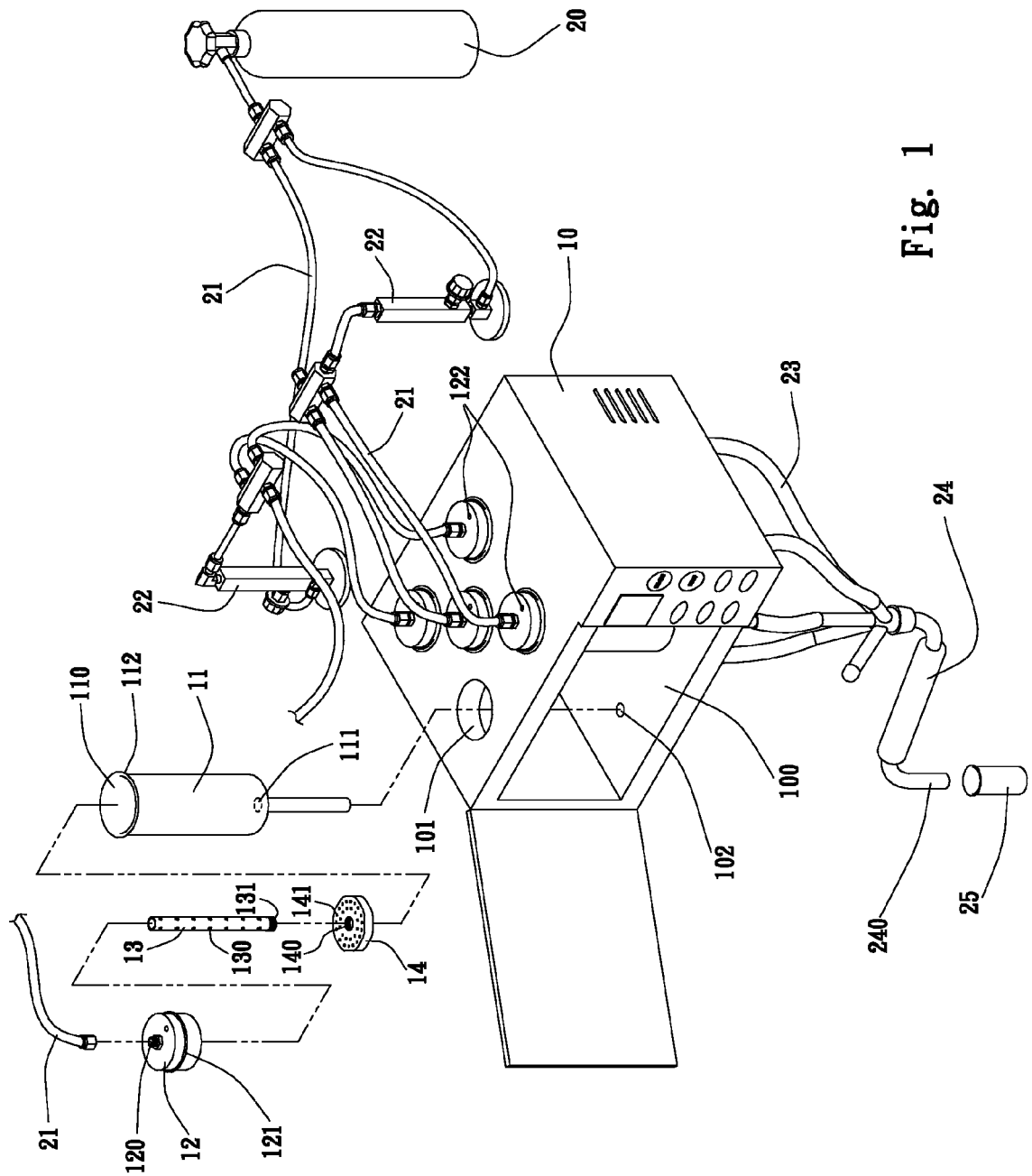
FIG. 1 is an exploded perspective view of a microwave extraction apparatus according to the invention.
Figure 2:
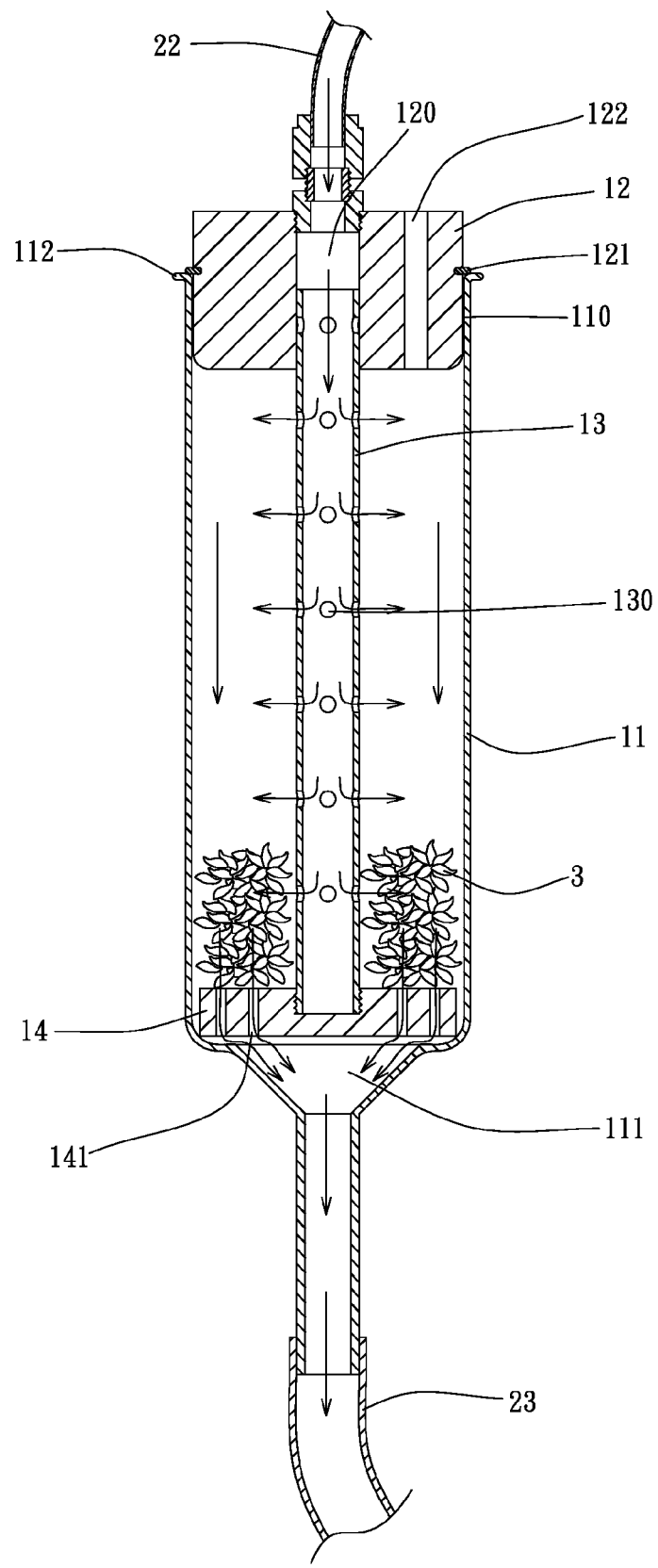
FIG. 2 is a longitudinal sectional view of the extraction cartridge where an extraction operation is shown.
Figure 3:
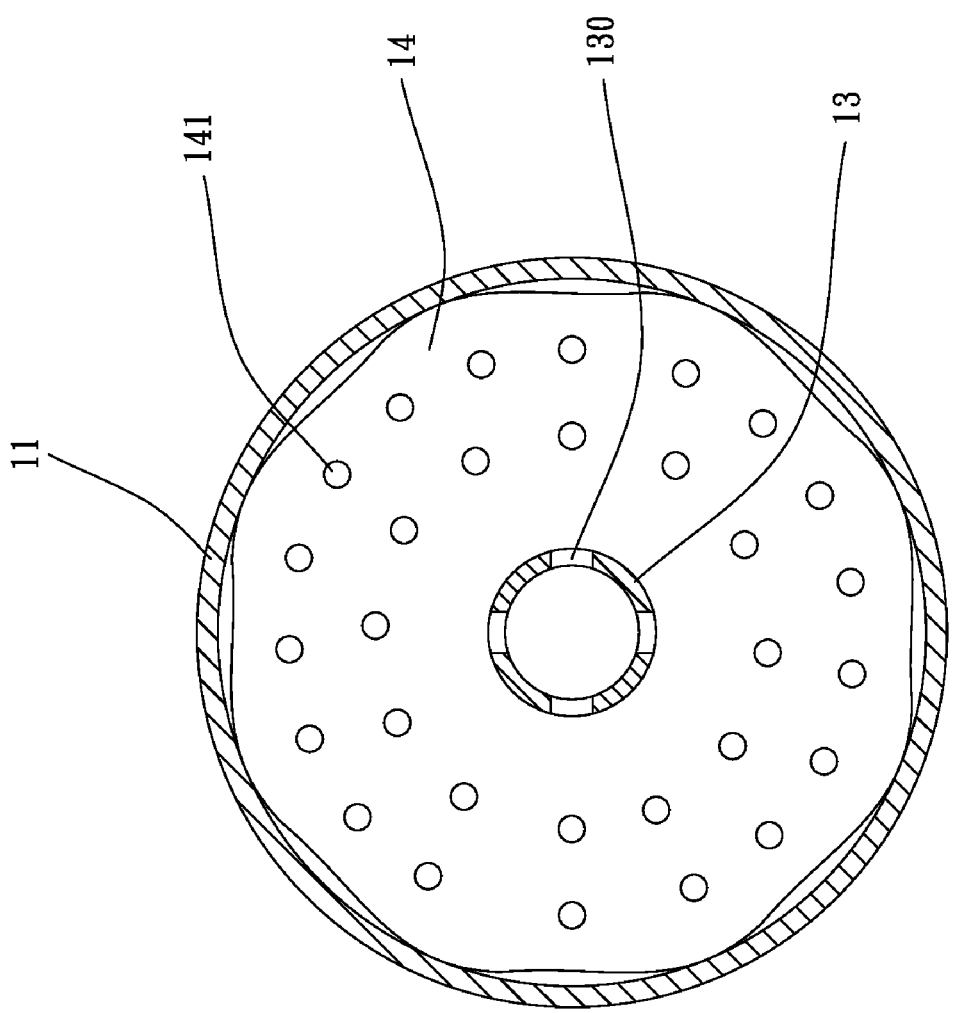
FIG. 3 is a cross-sectional view of an intermediate portion of FIG. 2.

Referring to FIGS. 1 to 3, a microwave extraction apparatus and method thereof in accordance with a first preferred embodiment of the invention are illustrated. The extraction apparatus comprises the following components as discussed in detail below.

A parallelepiped microwave chamber 10 comprises a heating space 100 and at least one microwave radiation source (not shown). A plurality of (e.g., five) upper openings 101 are provided on the top surface of the microwave chamber 10 and also five lower openings 102 (only one is shown) are provided on the bottom surface thereof respectively. The microwave chamber 10 is adapted to heat an object in the heating space 100 uniformly and continuously. The microwave radiation has a frequency at 915 MHz or 2,450 MHz. The microwave chamber 10 has a power level of 100 W to 1,500 W with a continuous distribution mode.

A hollow, cylindrical extraction cartridge 11 is made of refractory glass, quartz, or ceramic. The extraction cartridge has a top opening 110 having an annular, outward extending flange 112. The bottom of the extraction cartridge is shaped as a funnel 111. In assembly, the funnel 111 is inserted through the top opening 101 to fasten at the lower opening 102 with the flange 112 being securely rested upon the mouth of the top opening 101. As a result, the extraction cartridge 11 is mounted in the microwave chamber 10.

A short cylindrical cap 12 made of metal or Teflon comprises both an axial channel 120 and a longitudinal through hole 122 with a thermal coupler or thermometer being mounted therein. A sealing O-ring 121 is affixed to outer surface of the cylindrical cap 12 at intermediate portion. The cap 12 is provided in the top opening 101 with the sealing O-ring 121 securely mounted against the top opening 110 of the extraction cartridge 11.

A plurality of (e.g., five) gas pipes 13 made of metal which comprises a plurality of apertures 130 on its surface and a lower threaded section 131. A multi-sided support 14 is made of metal or Teflon. The support 14 is fitted on the bottom of the extraction cartridge 11. A threaded hole 140 is provided on the top center of the support 14, which further has a plurality of longitudinal through apertures 141 around the threaded hole 140. The threaded section 131 is fastened into the threaded hole 140 to tighten both the gas pipe 13 and the support 14 securely. The top end of the gas pipe 13 is also fitted in the channel 120.

A gas supply 20 is provided and comprises a plurality of (e.g., two) first gas lines 21 having one ends connected to the gas supply 20 and the other ends each connected to a check valve 22. A plurality of (e.g., five) second gas lines 21 have one ends connected to the check valve 22 and the other ends is connected to the channel 120 respectively. Hence, gas may be supplied from the gas supply 20 to each extraction cartridge 11. The supplied gas is preferably an inert gas, such as nitrogen ($N_2$) or helium (He) because inert gas has a better chemical stability than oxygen during the high temperature extraction process. The check valve 22 is adapted to control both gas pressure and flow rate in the gas line 21.

A plurality of (e.g., five) distillate lines 23 each has one end connected to the funnel 111. A condenser 24 has an inlet at one end connected to a coupler 230 at the other ends of the distillate lines 23 and an outlet 240 at the other end. Preferably, the condenser 24 is operated at a temperature range between −20° C. and 15° C. Cooling water is continuously circulated in the condenser 24 for cooling the gas flow which flows out of the extraction cartridges 11 via the distillate lines 23. Finally, a collecting reservoir 25 is disposed below the outlet 240 of the condenser 24 to collect the distillates, which can retain primary color of the odorous raw materials.

Note that the vertices of the support 14 are urged against the inner surface of the extraction cartridge 11. Further, odorous raw materials 3 (e.g., flowers, leaves, stems, and Chinese medicinal herbs, etc.) are placed on the support 14 prior to sealing the extraction cartridge 11 by means of the cap 12.

An extraction process according to the invention is illustrated below. The extraction process comprises the following steps:

Preparation in which each set of extraction cartridge 11 and support 14 is installed in the heating space 100. Then, odorous raw materials 3 (e.g., flowers, plant stems and leaves, or Chinese medicinal herbs which carries water and/or oil) is filled in the extraction cartridges 11 for extraction. Consequently, a cap 12 is sealed on the top opening 101 of the extraction cartridge 11 to prevent gas from leaking. Finally, the gas supply 21 is connected to the channels 120 of the extraction cartridges 11 with gas lines 21; the funnels 111 of the extraction cartridges 11 are connected to the condenser 24 with the distillate lines 23 respectively.

Gas is charging from the gas supply 20 to the gas pipes 13 via the check valve 22 and the gas lines 21. Note that gas in the gas pipe 13 flows in a top-down fashion and flows out into the inner space of the extraction cartridge 11. Pressure inside the extraction cartridge 11 will decrease a little as a result of friction occurring between gas and the odorous raw material 3. And then, the pressurized gas carries fragrant compounds of the odorous raw materials 3 through the apertures 141 and small gaps between the edges of the support 14 and the inner surface of the extraction cartridge 11 into the funnel 111. According to Le Chatelier's principle "If a chemical system at equilibrium experiences a change in concentration, temperature, volume, or total pressure, then the equilibrium shifts to counter-act the imposed change." Thus, extraction efficiency will be promoted when a gas flows on outer surface of the odorous raw material 3. Preferably, the check valve 22 is adapted to adjust gas pressure to a range between 110 KPa and 210 KPa.

Heating process is performed immediately after the microwave chamber 10 is turned on. Apparent temperature in the extraction cartridge 11 may reach a range between 100° C. and 115° C. after 5 minutes microwave heating period. Fragrant compounds of the odorous raw materials 3 will be vaporized and then flows out of the extraction cartridge 11 via the distillate lines 23 during 5 to 150 minutes heating progress. Preferably, a "K-type" or a "R-type" thermal coupler is mounted in the hole 122 for an apparent temperature measurement at different location in the inner space of the extraction cartridge 11 simultaneously the microwave heating process is proceeding. The odorous raw materials 3 inside of the extraction cartridge 11 can be uniformly heated by the microwave radiation due to a reflection of microwave radiation by metal construction of the gas pipe 13. Hence, local overheat phenomenon (so call "hot-spot") on the odorous raw materials 3 can be eliminated to prevent the odorous raw materials 3 from being burned or toasted.

Cooling process in which cooling water is continuously circulating through the condenser 24 and gas flow with the extracted compounds via the funnels 111 will be condensed in the condenser 24. Finally, the distillate flows out of the condenser 24 through the outlet 240 and is collected by the collecting reservoir 25.

The invention has the following advantages:

The extracting components associated with the microwave heating are simple and is easy to be controlled. The extraction process can be performed without any preheating necessary. Microwave heating reveals not only quickly but also effectively. The extraction process by microwave heating can be stopped or restarted at any time. Both volatile aromatic compounds and pigments of the odorous raw materials 3 which have higher boiling point can be extracted successfully by the top-down extraction fashion. As a result, the extracted substance is colorful and this is a contrast to the transparent distillates obtained by the typical batch distillation. Therefore, the invention has a high economic value.

The extraction cartridge is preferably flushing with inert gas such as nitrogen ($N_2$) or helium (He) when the extraction process is proceeding. The top to bottom path of inert gas flushing, a reflection of microwave radiation by the metal gas pipes, and be performed under a higher temperature and/or a higher pressure conditions result not only an uniformly heating (i.e., avoiding partial overheating in the extraction cartridge) but also a fully vaporize water content of the odorous raw materials 3 simultaneously. Thus, fragrant compounds can be carried successfully from the extraction cartridge 11 to the condenser 24. Based on this point, it is contrary to the typical batch distillation in which vapor with volatile condensates prior to reaching the condenser because its temperature decreases definitely. Hence, the invention is more effective in the extraction of essential oils, essence, and pigments from the odorous raw materials 3.

The extractives obtained both by the invention method and by the typical extraction method are further examined by a GC-MS (gas chromatography-mass spectrometry) to compare their contents. It is found that the extractives by the invention method exhibit a fragrant degree about 300 to 600 times higher than those obtained by the typical extraction method.

A plurality of extraction cartridges can be employed with several merits, such as a reduction of extraction time, mass of raw material can be extracted simultaneously, and a promotion of extraction efficiency, etc. Furthermore, energy saving is seen significantly.

Since the extraction process by microwave radiation heating is free from addition of any organic solvent and/or any artificial chemical compound, the apparatus and method of extraction implemented in the invention herein are really environmentally friendly.

While the invention herein disclosed has been described by means of specific embodiments, numerous modifications and variations could be made thereto by those skilled in the art without departing from the scope and spirit of the invention set forth in the claims.

What is claimed is:

1. An extraction apparatus for obtaining essential oils, essence, and pigments from plant raw materials comprising:
   a microwave chamber comprising a plurality of pairs of top and bottom openings;
   a plurality of extraction cartridges filled with a plant raw material, each of the extraction cartridges comprising top and bottom openings secured to the top and bottom openings of the same pair of the microwave chamber respectively;
   a plurality of caps, each of the caps comprising an axial channel and a sealing O-ring affixed to an outer surface thereof, each of the caps being fastened in the top opening of the extraction cartridge;
   a gas supply for supplying gas flow into the extraction cartridges via gas lines;

a condenser comprising an inlet connected to the bottom openings of the extraction cartridges, and an outlet;

a plurality of gas pipes, each of the gas pipes comprising a plurality of apertures on its surface and a lower threaded section, and a plurality of supports, each of the supports disposed on a bottom of the extraction cartridge and comprising a threaded hole on its top center and a plurality of longitudinal apertures around the threaded hole wherein each of the threaded sections is secured to the threaded hole and a top end of each of the gas pipes is fastened in the axial channel of each of the caps; and at least one check valve, each of the at least one check valve adapted to adjust the pressure of the gas flowing out of the gas supply to a range between 110 KPa and 210 KPa.

* * * * *